United States Patent

Bowen et al.

[19]

[11] Patent Number: 6,094,649
[45] Date of Patent: Jul. 25, 2000

[54] KEYWORD SEARCHES OF STRUCTURED DATABASES

[75] Inventors: Stephen J Bowen, Sandy; Don R Brown, Salt Lake City, both of Utah

[73] Assignee: PartNet, Inc., Salt Lake City, Utah

[21] Appl. No.: 08/995,700

[22] Filed: Dec. 22, 1997

[51] Int. Cl.[7] .................................................. G06F 17/30
[52] U.S. Cl. ........................................ 707/3; 707/5; 707/4
[58] Field of Search .................................. 707/1, 2, 3, 4, 707/5, 531, 532, 500

[56] References Cited

U.S. PATENT DOCUMENTS

| | | | |
|---|---|---|---|
| 5,375,235 | 12/1994 | Berry et al. .................................. | 707/5 |
| 5,469,354 | 11/1995 | Hatakeyama et al. ...................... | 707/3 |
| 5,546,578 | 8/1996 | Takada ........................................ | 707/5 |
| 5,685,003 | 11/1997 | Peltonen et al. ......................... | 707/531 |
| 5,787,295 | 7/1998 | Nakao ...................................... | 707/500 |
| 5,787,421 | 7/1998 | Nomiyama ................................ | 707/5 |
| 5,799,184 | 8/1998 | Fulton et al. ............................. | 707/2 |
| 5,832,479 | 11/1998 | Berkowitz et al. ......................... | 707/3 |
| 5,845,273 | 12/1998 | Jindal ....................................... | 707/1 |
| 5,845,305 | 12/1998 | Kujiraoka ................................ | 707/532 |
| 5,848,409 | 12/1998 | Ahn .......................................... | 707/3 |
| 5,848,410 | 12/1998 | Walls et al. ............................... | 707/4 |

OTHER PUBLICATIONS

"AltaVista Software—Press Release", Anon., *AltaVista Software*, 1997, p. 1.
"Assorted References", pp. 1–38.
"Charles Schwab Broadens Deployment of Fulcrum–Based 'Corporate Knowledge' Library Application", Uknown, Fulcrum Technologies Inc., Mar. 3, 1997, pp. 1–3.

(List continued on next page.)

*Primary Examiner*—Hosain T. Alam
*Assistant Examiner*—Thuy Pardo
*Attorney, Agent, or Firm*—Computer Law++

[57] ABSTRACT

Methods and systems are provided for supporting keyword searches of data items in a structured database, such as a relational database. Selected data items are retrieved using an SQL query or other mechanism. The retrieved data values are documented using a markup language such as HTML. The documents are indexed using a web crawler or other indexing agent. Data items may be selected for indexing by identifying them in a data dictionary. The indexing agent produces an index that associates keywords with resource locators such as URLs, hot links, file paths, or distinguished names. After a user provides a keyword to a search engine interface, the index is used to obtain a resource locator that is associated with the keyword. The resource locator is used to retrieve the item's current data from the structured database. A document containing the retrieved data is then generated and provided to the user.

45 Claims, 3 Drawing Sheets

OTHER PUBLICATIONS

"Deployment Choices for English Wizard", Anon., Linguistic Technology Corporation, 1996, pp. 1–2.

"Effective Use of Relational Databases On The Internet", L. Harris, Linguistic Technology Corporation, 1996, pp. 1–3.

"Exposé", Unknown, Linguistic Technology Corporation, 1996, pp. 1–2.

"Fulcrum Corporate Overview", Unknown, Fulcrum Technologies Inc., 1997, pp. 1–6.

"Fulcrum Knowledge Network", Unknown, Fulcrum Technologies Inc., 1997, pp. 1–10.

"Fulcrum SearchServer", Unknown, Fulcrum Technologies Inc., 1995–1996, pp. 1–4.

"Fulcrum unifies data searches", J. Senna, InfoWorld Publishing Company, Apr. 28, 1997, pp. 1–2.

"Independent Market Research Ranks Fulcrum 'Number One'", Uknown, Fulcrum Technologies Inc., Jun. 17, 1997, pp. 1–2.

"INFORMIX–Universal Web Connect: Getting Started", Uknown, www.informix.com, no later than Nov. 14, 1997, pp. 1–10.

"Introduction to ALIWEB", Uknown, NEXOR Ltd, 1995, p. 1.

"Knowledge Network: Fulcrum's Leading Edge Technology", J. Blair, Gartner Group, Mar. 26, 1997, pp. 1–2.

"Managing Text with Oracle8 ConText Cartridge", Uknown, Oracle Corporation, 1997, pp. 1–10.

"Nabisco Selects Fulcrum Find! For Information Sharing Across The Organization", Uknown, Fulcrum Technologies Inc., Feb. 3, 1997, pp. 1–3.

"Oracle ConText® Cartridge Release 2.0" Unknown, Oracle Corporation, 1995, 1997, pp. 1–4.

"Plain–English Database tools—English Wizard and VB ELF let you make database queries without using SQL", A. Feibus, CMP Media Inc., Nov. 17, 1997, pp. 1–5.

"SEARCH '97 White Paper", P. Courtot, www.verity,com, no later than Jun. 6, 1997, pp. 1–6.

"Site–index.pl—indexing your Web site", R. Thau, www.ai.mit.edu, no later than Nov. 13, 1997, pp. 1–4.

"Strategic Direction in Electronic Commerce and Digital Libraries: Towards a Digital Agora", N. Adam et al., *ACM Computing Surveys, vol. 28, No. 4*, Dec. 1996, pp. 818–835.

"Sybase SQL Anywhere Professional and the Internet", Uknown, Sybase, Inc., 1997, pp. 1–8.

"Text–enabling Web Applications with Oracle ConText Option", Uknown, Oracle Corporation, 1995, 1997, pp. 1–8.

"The TSIMMIS Approach to Mediation: Data Models and Languages", H. Garcia–Molina et al., Stanford University, Unknown, pp. 1–17.

"Unlocking the Value of Text with Oracle ConText Cartridge", F. Litman, Oracle Corporation, 1994–97, pp. 1–3.

"The Web Robots Database", M. Koster, info.webcrawler.com, no later than Nov. 13, 1997, pp. 1–2.

"What tools are currently available", L. Cooper, stork.uk-c.ac.uk, no later than Nov. 13, 1997, pp. 1–2.

"Yahoo!", uknown, Yahoo! Inc., 1994–97, p. 1.

KEYWORD SEARCHES OF STRUCTURED DATABASES

FIELD OF THE INVENTION

The present invention relates to information management and retrieval in a digital system, and more particularly to the use of keyword indexes for retrieving data both from structured databases such as relational databases and from textual documents such as web pages.

TECHNICAL BACKGROUND OF THE INVENTION

Information is stored digitally in a wide variety of formats, which are accessed with a bewildering assortment of retrieval operations. As computers containing digital information are increasingly connected with one another, the differences between different information stores become more evident and more frustrating. Thus, many approaches have been proposed or implemented to make information more widely available.

Vast amounts of information are stored by corporations, government agencies, and other entities in structured databases, of which the most widely used are relational databases. In a typical relational database, individual pieces of data such as names, addresses, prices, and part numbers are stored in rows and columns designated by headings and organized into tables or other relations. The smallest unit of manipulation is an individual database record holding one (or perhaps a few) data values.

Indexes into the data records and tables are generated and maintained internally by database management software to make record accesses more efficient. Each database has its own set of indexes. The indexes are updated whenever a record's value is changed, or in some cases at periodic intervals. In some relational databases, all records are indexed; in others, indexes are created only after the number of records or the importance of particular records passes a threshold or another efficiency criterion is met. In many relational (and other) databases only primary database key values are indexed; other data values are retrieved by way of the keys and the relationships defined between key values and other (secondary) values. Information about the data values is provided through a database query language. The various dialects of the SQL language are among the most widely used query languages.

Enormous amounts of information are also stored in textual documents using markup languages such as HTML, XML, and other variations on SGML. Markup language document stores differ from relational databases in several important ways. The smallest unit of retrieval is typically an entire "page" (which may actually print as several pages). Each page typically contains many more words or numbers than a relational database record. The pages are not organized into tables or other relations, but are instead connected by hyperlinks or hot links. Pages may also be grouped in a file system by directory placement and/or file naming conventions.

Web crawlers and other network-roaming agents index the pages at sporadic intervals. After a given page is posted to the network, considerable time may pass before an agent encounters and indexes the page. A given index often points to information at numerous sites. The same page may be indexed in different ways by different agents. Sometimes all the words in a page are indexed, but more often selected words are indexed. Since the indexed words are selected by the web page author, they do not always impartially and accurately summarize the page's contents. The indexes are used by keyword search engines that provide users with an interface that is substantially simpler, but also less powerful, than typical SQL interfaces.

Much useful information is also stored in word processor textual documents, such as *.doc, *.pdf, *.ps, *.rtf, *.txt, and other documents. Word-processed document repositories and their associated document management systems are similar to web sites and to relational databases in some ways, and different in others. Some repositories are organized only by placing documents in particular directories in a file system hierarchy; no indexing is provided to speed searches. Other repositories index their documents according to the entire text of each document in the repository, but indexing is more commonly based on selected keywords provided by the document's author or by a human or automated subject matter classifier. Each repository has its own set of indexes. The user interface may support either a keyword search of the documents or an SQL-like query of an associated structured database of document keywords, authors, dates, titles, and similar data.

Unfortunately, the differences between these various information storage and retrieval approaches makes it difficult to provide a single interface that gives users access to information from all available digital sources. The attempts to bridge differences between different sources of information are almost as varied as the sources themselves, and fully comprehensive indexes are not available.

One approach to increasing information availability involves "dynamic HTML." An SQL query embedded in an HTML web page is extracted by a web server, sent to a relational database query handler, and processed in conventional manner by the relational database management system. The results of the query are placed in HTML format and returned to the user. This system strikes a balance between SQL's flexibility and SQL's complexity by deciding what queries are available, expressing them in natural language in the web page, and writing them in SQL ahead of time for the user. However, users who do a keyword search using a web browser or intranet search engine will not necessarily discover that the relational database contains relevant information, even if the keywords searched are among the data that would have been retrieved by the dynamic HTML query, because the web crawler index is based on the text of the dynamic HTML page, not on the relational data.

Another approach uses a natural language front-end to translate an English sentence into an SQL query which is then processed in conventional manner. The system provides greater flexibility than dynamic HTML, allowing users to write questions in a natural language and then translating the questions into SQL queries (sometimes with varying degrees of success). As with dynamic HTML, however, users who do a keyword search using a browser or search engine will not necessarily discover relevant information even if the keywords searched are among the data that would have been retrieved by an SQL query. The keyword search results might not even direct users to the natural language front-end.

Accordingly, another approach proceeds as follows. The column or table heading names and relationship names used in the database are extracted from a data dictionary that defines the relational database's structure. Selected data values are added, and then synonyms of all these terms are added, creating a list of "magnet terms." The magnet terms are placed in a web "magnet page" that also has an SQL query interface. The magnet terms will be indexed by a web crawler, so that users who do keyword searches using the magnet terms are directed to the magnet page and its SQL query interface.

The magnet page query interface may be a dynamic HTML interface, with prewritten SQL queries accompanied by explanatory text. The query interface may also be a natural language interface configured to receive English questions and translate them into SQL queries. Or the query interface may simply accept SQL queries and pass them to the database management software. Of course, the query interface may also combine dynamic HTML, natural language translation, and straightforward SQL querying capabilities.

In any case, a SQL query from the query interface is directed to the relational database, which uses its internal indexes to retrieve the data. The results are packaged as HTML and displayed to the user. This approach has the advantage that if their keywords are among the magnet terms, then users who do a keyword search will be directed to the magnet page for the relational database containing the relevant information. However, users will usually not reach the query interface unless the data they seek appears in the magnet terms. Moreover, even if they do reach the query interface they must still find or formulate an SQL query that will retrieve the relevant information from the database.

Instead of attempting to make relational database information available to web browsers, a different approach tries to make web pages accessible through a relational database interface. Text documents such as plain text files, HTML pages, word processor documents, and the like are entered as records in a relational database. Keywords or the full text of the documents are entered in the database's internal indexes to support document retrieval through the database query interface using SQL or another query language.

This approach has the advantage of bringing powerful and well-understood relational database software to bear on the problem of retrieving relevant text documents. But users who browse a network on which the relational database occupies only one or a few nodes will not necessarily realize that the information they seek resides in documents indexed into the database in question, even if the keywords they use in their browsing appear in the document indexes. The indexes are internal to the database and thus are used only in response to SQL or like queries directed specifically at the database.

Other approaches are also described in the literature and/or embodied in software currently being used. For instance, structured databases other than relational databases are sometimes used, including hierarchical, object-relational, object-oriented, and other structured databases. Also, at least one web crawler now indexes word processor documents as well as markup language documents. But the examples above illustrate several important characteristics of different approaches to publishing information:

the smallest unit of data retrieved (e.g., database record, web page);
the rules used to organize data (e.g., relations, file placement and naming conventions, hyperlinks);
how data is retrieved (e.g., SQL queries, keyword searches);
what data is indexed for each data unit (e.g., headings, primary database keys, author-defined keywords, selected keywords, full text);
where the indexes reside (e.g., within the database system or outside it);
which sources are indexed (e.g., the records of a given database, the web sites visited by the crawler); and
when the index is updated (e.g., when the record is entered or modified, periodically, when the crawler visits the site).

When existing approaches are viewed in the manner discussed above, it becomes apparent that improvements are possible. For instance, it would be an advancement in the art to make structured database information visible to net-wide keyword searches when a user has not yet identified the database in question as one likely to contain relevant information.

It would be an additional advancement to provide such a method and system which do not interfere with existing retrieval mechanisms, but serve instead as additional tools for identifying and retrieving information based on keywords.

Such a method and system are disclosed and claimed herein.

BRIEF SUMMARY OF THE INVENTION

The present invention provides a method and system for supporting keyword searches of data items in a structured database, such as a relational database. One method of the invention begins with selection of at least one data item in the structured database; each selected item contains data and has a corresponding location identifier which identifies the item's location within the structured database. For instance, a relational database record may be identified by an object class name and one or more primary database key values.

The selected data items are documented by creating at least one document, such as a web page, which resides outside the structured database as a memory stream or as a file and which contains a textual representation of each selected item's data. The documents are then indexed by creating an index outside the database which associates keywords in the textual representation of each selected item's data with that item's location identifier. The indexed keywords are more comprehensive and accurate than terms used in conventional magnet pages or web page meta content tags because they are generated directly from most or all of the data values.

If the structured database includes data items organized as records in relations according to a data dictionary, then selection may be accomplished by providing a supplemental data dictionary which identifies the selected records or tables. In this case, the indexing step only indexes records and tables that are identified by the supplemental data dictionary. A data dictionary may also be used to identify selected data items for binary-only relational databases that have no accessible data dictionary and for non-relational databases.

Indexing may be accomplished by providing to a keyword search engine indexing agent both the textual representation of each selected item's data and the selected item's location identifier. The indexing agent produces an index that associates keywords with resource locators, and each resource locator includes a textual representation of a data item location identifier. Suitable indexing agents include web crawlers, indexing "bots", and other text indexing tools. Suitable resource locators include URLs, hot links, file paths, and distinguished names, object class names, table names, and primary database key values, among others.

Users provide keywords to a search engine interface in a system according to the invention. The system uses the index to obtain a resource locator that is associated with the keyword. The resource locator is used to retrieve the item's current data from the structured database, using SQL queries or other structured database retrieval mechanisms. A document containing the retrieved data, such as a web page, is then generated and provided to the user.

The invention bridges a gap between loosely structured textual keyword search information technologies, on the one hand, and highly structured relational/hierarchical query language search database technologies, on the other. Web pages on the Internet or on an intranet are effective for textual information that is relatively static and unstructured, such as press releases, user guides, policy statements, and procedure manuals. Other information, such as availability, pricing, performance and planning records, is more dynamic and has traditionally been maintained in highly structured databases such as relational or object-oriented databases.

The invention makes it possible to use a single search method—keyword searching—to locate and retrieve desired information from different types of information sources. In particular, the invention makes it possible to publish selected portions of a relational database in a manner that allows users to retrieve relational data without knowing details of the database's internal organization. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
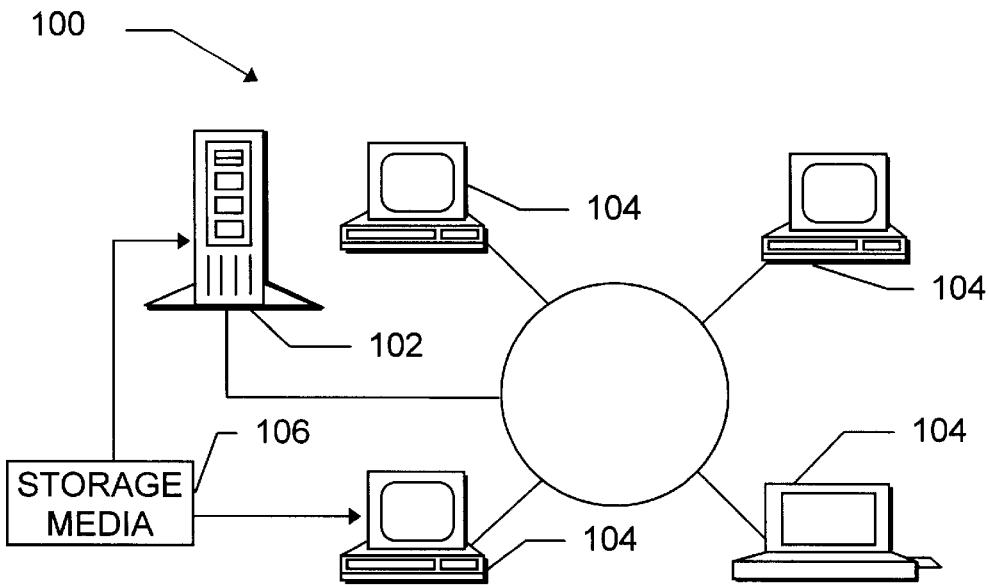
FIG. 1 is a diagram illustrating one of many networks suitable for use according to the present invention.

The present invention relates to a method and system for assisting keyword searches of highly structured data. Before detailing the architecture of methods and systems according to the invention, the meaning of several important terms is clarified. Specific examples are given to illustrate aspects of the invention, but those of skill in the art will understand that other examples may also fall within the meaning of the terms used. Some terms are also defined, either explicitly or implicitly, elsewhere herein.

Terminology

As used here, a "keyword" search is a pattern-matching search which tries to locate instances of digital data using a key word or phrase. Many conventional web search engines support keyword searches. Keywords may contain wildcards. For instance, if the question mark is used as a wildcard capable of matching any single character and the asterisk is used as a wildcard capable of matching any zero or more characters, then the keyword "b?t*" would match the words "bat", "bet", "bit", "bot", "but", "battle", "bitten", and "butane", among others. In some cases keywords may also contain regular expressions, such as the regular expressions used in the familiar lexical analysis program lex or the familiar text editors emacs and vi. A keyword may contain smaller keywords connected by operators such as AND and OR.

One alternative to keyword searching is "browsing" through the available data until values of interest are located. Browsing is available in most computer information management systems, regardless of whether keyword searches are supported. An important difference between keyword searching and browsing is that keyword searches focus much more quickly on portions of the data that are likely to be of interest. This is particularly true if the keyword search is performed on data that is grouped by subject matter. For instance, a search using the keyword "bat" in data classified by subject matter could lead quickly to baseball statistics rather than a discussion of flying mammals.

Many conventional structured database systems support "query" searches through SQL or another query language. An important difference between query searches and keyword searches is that query searches normally presume the existence of relations or other structure in the data and contain assumptions about that structure For instance, many SQL queries are of the form SELECT X FROM Y WHERE Z, with X being the heading name of a column in a table called Y, and Z being some constraint on the values stored in the column. Such a query will be rejected if no table named Y exists, or if Y exists but has no column named X.

By contrast, keyword searches typically assume nothing about the relationships or structures that may internally connect different instances of matching data. In particular, a keyword search of a relational database according to one embodiment of the present invention for a keyword K will identify all data values in the exposed portion of the database that match K, regardless of the table names or column names being used.

Even if a particular relational database system supported queries such as SELECT ALL FROM ALL WHERE (ENTRY CONTAINS 'K'), this would not be equivalent to a system according to the invention which assists a keyword search of all database records for matches to the keyword K. For instance, the internal indexing and retrieval mechanisms in relational databases are optimized for selecting and combining records in rows and columns and tables according to the database structure as well as testing data value constraints; these mechanisms are not optimized for retrieving every data value and then testing it against the key. Also, web crawlers and other keyword index builders index all data values supplied to them, while relational databases typically index only selected columns or rows. Finally, indexes according to the invention will generally have a much broader context or scope than an internal relational database index, involving not just a single relational database but many other information sources as well; this makes the inventive indexes more useful with all-purpose or comprehensive search efforts.

As used here, a "structured database" is a collection of data items organized primarily by rules other than those governing natural languages such as English. The data items may contain natural language text such as addresses or part names in a relational database, but relations, tables, trees, or other structures are the primary means of organization. Structured database operations aid decision-making by allowing users to combine individual data items in various ways, as illustrated in the SQL query above.

Relational databases are one example of structured databases; other examples include hierarchical, inverted-list, object-relational, object-oriented, and flat-file databases. Structured databases may be stored in a single location or distributed between several machines. Regardless of the approach taken to storage, many structured databases can be accessed through a network.

As used here, "network" includes local area networks, wide area networks, metropolitan area networks, and/or various "Internet" networks such as the World Wide Web, a private Internet, a secure Internet, a value-added network, a virtual private network, an extranet, or an intranet. One of many possible networks suitable for use according to the invention is shown in FIG. 1, as indicated by the arrow labeled 100. The network 100 includes a server 102 and several clients 104; other suitable networks may contain other combinations of servers, clients, and/or peer-to-peer nodes, and a given computer may function both as a client and as a server. The computers connected by a suitable network may be workstations, laptop computers, disconnectable mobile computers, servers, mainframes, so-called "network computers" or "lean clients", personal digital assistants, or a combination thereof.

The network may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, and/or other data transmission "wires" known to those of skill in the art. The network may encompass smaller networks and/or be connectable to other networks through a gateway or similar mechanism.

As suggested by FIG. 1, at least one of the computers is capable of using a floppy drive, tape drive, optical drive, magneto-optical drive, or other means to read a storage medium 106. A suitable storage medium 106 includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the computer system to operate in a specific and predefined manner as described herein. Thus, the medium 106 tangibly embodies a program, functions, and/or instructions that are executable by computer(s) to assist keyword searches of structured data substantially as described herein.

Suitable software for implementing the invention is readily provided by those of skill in the art using the teachings presented here and programming languages and tools such as Java, Pascal, C++, C, CGI, Perl, SQL, APIs, SDKs, assembly, firmware, microcode, and/or other languages and tools.

Overview of Components

Figure 2:
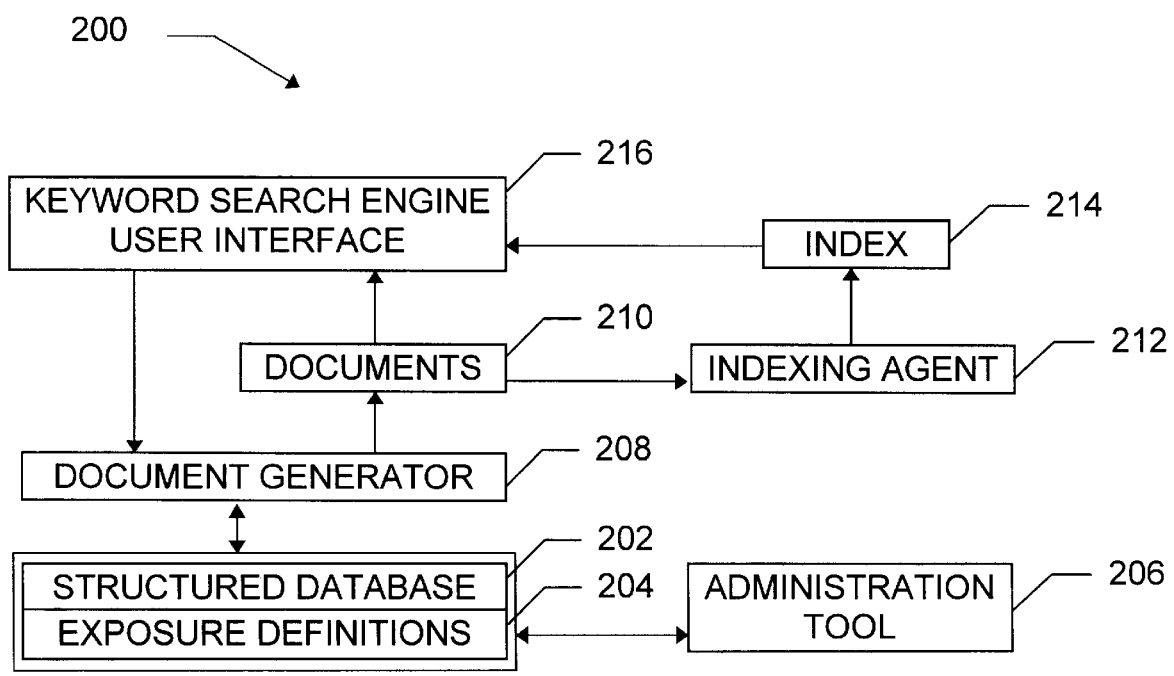
FIG. 2 is a block diagram further illustrating components of the network shown in FIG. 1 and other suitable systems according to the invention.

An overview of the main components of the invention and its environment is now given with reference to FIG. 2. A system 200 according to the invention operates using the network 100 or another suitable computer system. A structured database 202 and corresponding exposure definitions 204 are part of the inventive system or accessible to the inventive system 200. The structured database 202 includes data items which have data values; suitable databases include conventional relational databases and other conventional structured databases with the associated database management system software.

The exposure definitions 204 identify the portion(s) of the structured database 202 that will be exposed to external keyword searches; the entire database 202 is typically already searchable by SQL or other conventional query means. Those of skill will appreciate that the system 200 can also be configured such that the exposure definitions 204 identify the portions of the database 202 which should NOT be exposed for keyword searching, if that approach is more efficient or convenient. In either case, the exposure definitions 204 may be in the form of a data dictionary, particularly if the structured database 202 is a relational database. However, the exposure definitions 204 may also take the form of a schema, particularly if the structured database 202 is a hierarchical database or other database defined by a schema.

In the illustrated system 200, the exposure definitions 204 are created and edited using an administration tool 206. The tool 206 may operate by extracting the definitions 204 from an existing data dictionary or schema, or it may be necessary to build the definitions from scratch by reverse engineering the data formats used in a binary-only structured database 202 and then generating a data dictionary or schema which can be edited to eliminate portions of the database 202 that should not be exposed.

A document generator 208 generates documents 210 which contain textual representations of the exposed data values in the database 202. In one embodiment, the document generator 208 generates a document, such as an HTML page, for each table in a relational database 202, containing the table's values in ASCII form, and then locates the document 210 at a Uniform Resource Locator (URL) corresponding to the table's location in the database 202. For instance, an HTML page containing the data values stored in a sales database table named "customers" might be generated and then stored at http://www.company.com/salesdb/customers.htm.

An indexing agent 212 reads the documents 210 and generates entries in an index 214. Suitable indexing agents 212 include web crawlers, spiders, indexing robots, and other indexing tools. The indexing agent 212 may be a network-roaming agent, or it may be tied to one or a few network sites. In one embodiment of the system 200, the indexing agent 212 indexes every data value in each document 210, not just "meta tag" or other values that may or may not be representative of the actual database contents. Unlike indexing processes running inside the structured database 202, the indexing agent 212 does not rely heavily on assumptions about the database structure but merely treats the documents 210 as sources of text which have little or no structure except that imposed by English or another natural language.

A keyword search engine user interface 216 may be integral with the indexing agent 212, or it may be a separate program provided by a separate vendor. The user interface 216 accepts keywords (possibly including wildcards) and uses the index 214 and possibly other components of the system 200 to locate corresponding documents 210.

Overview of Operation

Figure 3:
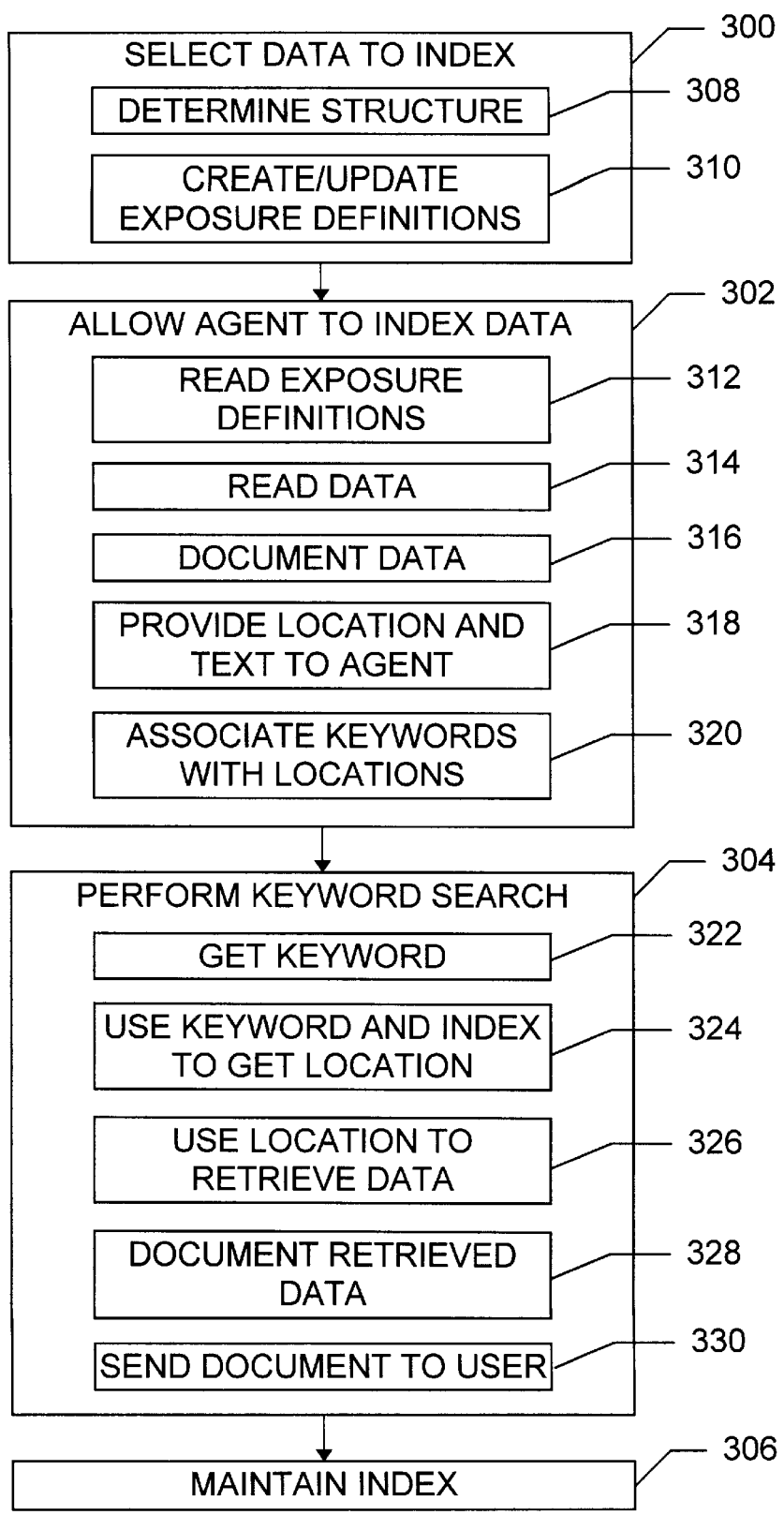
FIG. 3 is a flowchart illustrating methods of the present invention.

An overview of the operation of the system 200 is now given, with reference to FIGS. 2 and 3. Four main steps are shown in FIG. 3: a data selecting step 300, an index allowing step 302, a search performing step 304, and an index maintaining step 306. These steps may be grouped for ease of explanation into an indexing phase (steps 300, 302, and 306) and a searching phase (step 304). During the indexing phase, the index 214 is created or updated. During the searching phase, the index 214 is used to respond to keyword searches directed at the database 202 (and often to other information sources as well). In practice, both phases may be happening simultaneously or in an interleaved fashion.

The selecting step 300 illustrated includes a structure determining step 308 and a definition editing step 310.

During the determining step 310, the administration tool 206 determines what structures are being used in the structured database 202. For instance, the tool 206 may read an existing data dictionary (sometimes called a "catalog") of a relational database 202 or an existing schema for a hierarchical or object-oriented database 202 and then identify the relations, partitions, record types, data types, links, indexes, primary database keys, and other structures used to organize the database 202. If no data catalog or schema exists, the tool 206 may be used to assist one of skill in reverse engineering the structure definitions by examining the binary contents of the database 202 together with display formats, documentation, and any other available structural information.

During the editing step 310, the exposure definitions 204 are initially created and/or updated by the tool 206. Some embodiments favor ease of editing by closely modeling the exposure definitions 204 after an existing data dictionary or schema for each database 202, while others favor portability in the document generator 208 by making all exposure definitions 204 for all databases 202 use a common format, such as a particular relational database data dictionary format.

In any case, the selecting step 300 selects at least one data item in the structured database 202, with each selected item containing data and each selected item having a corresponding location identifier which identifies the item's location within the structured database 202. Suitable location identifiers include table, row, and/or column names; unique relational data key values; paths, filenames, common names, contexts, and/or distinguished names; offsets, pointers, and/or record numbers; pointer array or hash table indexes or entry numbers; transaction numbers or sequence numbers; universal unique identifiers (UUIDs) or globally unique identifiers (GUIDs); and combinations of such identifiers. The name or location of the database 202 may be part of a suitable location identifier, but merely identifying the database 202 is not sufficient.

The allowing step 302 illustrated includes a definition reading step 312, a data reading step 314, a data documenting step 316, a providing step 318, and an associating step 320. During the definition reading step 312, the document generator 208 reads the exposure definitions 204 and builds or locates a checklist that will be used to make sure all selected data is exposed for indexing.

During the data reading step 314 the document generator 208 reads the selected data from the database 202. Data reads may be performed directly from the binary database 202 using low-level file system commands, but it may be better to retrieve the data using the using the SQL interface, application program interface (API), or other existing data retrieval software of the database 202. Data reads may be done all at once, but more often the data reading step 314 and the data documenting step 316 will be repeated in pairs, so that a chunk of data is read and then documented, the next chunk of data is read and documented, and so forth until all selected data is documented. Of course, the providing step 318 and the associating step 320 may also be made part of the loop, so that each chunk of data is indexed before the next chunk is read.

More generally, FIG. 3 shows a particular order and grouping for the main steps 300 through 306 and for various subsidiary steps. However, those of skill in the art will appreciate that the steps illustrated and discussed here may be performed in various orders, except in those cases in which the results of one step are required as input to another step. Likewise, steps may be omitted unless called for in the claims, regardless of whether they are expressly described as optional in this Detailed Description. Steps may also be repeated, or combined, or named differently. In one alternative embodiment, for instance, an "indexing" step includes the step 318 of providing to the keyword search engine indexing agent 212 both the textual representation of each selected item's data and the selected item's location identifier.

During the data documenting step 316, the document generator 208 documents the selected data items by creating at least one document outside the structured database 202; the document(s) 210 contain a textual representation of each selected item's data. The document may exist as a stream of data in RAM or coming from a network or other connection. The document may also be stored on disk as a file, but those of skill will appreciate that throughput generally increases when disk accesses are reduced or eliminated. An index such as the index 214, a web crawler index, or an internal database 202 index, is not a suitable result of the documenting step 316. Rather, textual documents produced by the step 316 include plain text or word processor documents, as well as markup language documents.

Markup language documents use markup language formats such as Standard Generalized Mark-up Language (SGML), which is specified in the 1986 International Standards Organization Standard No. 8879. Familiar markup languages include HTML and XML. Other mark-up languages are used in Folio infobases, Microsoft Word documents, Corel WordPerfect documents, troff documents, and various hyperlink and hypertext documents (MICROSOFT WORD and COREL WORDPERFECT are marks of Microsoft and Corel, respectively). Mark-up languages generally provide links which associate a particular, pre-selected location in a primary text file with additional text, images, or other information, or with links to email, display, or other software.

In one embodiment, documents 210 produced with the step 316 include a comprehensive textual representation of each selected item's data. "Comprehensive" means that every data value, or at least substantially every data value, appears separately in the documents 210. Every exposed data value that might reasonably be used as a keyword should appear in the documents 210. Merely listing table, row, column, partition, subtree, or other group names is not sufficient, although these may be treated as data values and placed in the documents 210. Nor is it adequate to summarize data or to select a relatively small sampling of "representative" or "boundary" or "central" data values.

However, common terms such as "a", "the", "not" and the like may be omitted from a comprehensive representation of data values to conserve space and improve keyword search efficiency. Also, comprehensiveness may be with respect to all selected (exposed) data values, or merely with respect to non-numeric exposed data values or some other efficiency grouping. For instance, a comprehensive index may include all selected data values for part numbers and customer names but exclude prices and dates in the selected data items.

During the providing step 318, the location of selected data in the database 202 and the textual representation of the selected data's values are provided to the indexing agent 212. If the agent 212 is a roaming agent, such as a web crawler, this may be accomplished by storing the documents 210 in files having names that contain the database locations of the documented data and then making the files accessible for indexing by the crawler. For instance, an HTML document 210 containing the textual representation of data values stored in a database 202 table named "customers" could be stored in a file named "customers.htm", or an XML document 210 containing the textual representation of data stored in an object database 202 could be stored in a file whose path name includes a class identifier, file type, and GUID, such as "/OLE/dll/42754580-16b7-11ce-80eb-00aa003d7352". If the agent 212 does not roam the system 200, then steps must be taken to bring the agent 212 together with the paired locations and textual data, such as by providing the pairs directly or indirectly as command line parameters or as interactive input to the agent 212.

During the associating step 320, the agent 212 associates the textual data values with their paired location(s) in the index 214, treating the data values as keywords. That is, the associating step 320 indexes the documents 210 by creating or updating the index 214 (which resides outside the database 202) so that the index 214 associates keywords in the textual representation of each selected item's data with that item's location identifier.

The index 214 and the indexing agent 212 may use B-trees, hashing, and other familiar data structures and operations to create or modify or extend the index 214. If the documents 210 are in HTML format and the agent 212 is a web crawler that only indexes meta content tag values then comprehensive indexing places all (or substantially all) data values in the meta content tags so they will be indexed by the agent 212.

In one embodiment, the agent 212 produces an index 214 that associates keywords with resource locators, and each resource locator includes a textual representation of a data item location identifier. Suitable resource locators include URLs (including hot links), file names, file path names, GUIDs, distinguished names, database key values, object or class or table or column names, and other resource identifiers.

A major advantage of the present invention is that the index 214 will tend to contain entries for data sources other than the database 202, unlike the internal database 202 indexes. For instance, the index 214 may associate keywords with storage locations in multiple relational and other databases, web sites, file systems, word processor document management systems, Lotus Notes (mark of IBM) databases, Microsoft Exchange (mark of Microsoft) databases, and other data sources.

Moreover, adding structured database 202 values to an existing index 214 with the invention leverages the existing values in the index 214, the existing indexing capability of the agent 212, existing search engine interfaces 216, and existing document 210 formats. The invention extends these capabilities, rather than attempting to replace them by forcing use of yet another closed, proprietary data format.

The keyword search performing step 304 illustrated includes a keyword obtaining step 322, an index using step 324, a retrieving step 326, a documenting step 328, and a transmitting step 330. During the keyword obtaining step 322, the user interface 216 obtains a keyword from a user. The user may be a human, or it may be a task, thread, or other computer process. The keyword may be a single word, a portion of a word with one or more with wildcards, or a combination of such words. Combinations are formed using familiar text search operators such as And, Or, But Not, Within N Words, Within Same Sentence, and the like. Keyword searches may be performed in the context of subject matter, chronological, or field scope constraints.

During the index using step 324, the search engine 216 uses the index 214 to obtain the location(s) of instances that match the keyword. Although an integrated interface and search engine 216 is illustrated, in other embodiments the index-using search engine is separate from the user interface and may even accept keyword searches from several different user interfaces. Familiar pattern-matching and lookup techniques, such as those currently available through Yahoo!, Digital Alta Vista, Infoseek, and Excite web sites (marks of their respective owners) and other keyword search engines may be used during the step 324.

During the retrieving step 326, documents 210 containing instances of the keyword may be supplied to the search engine 216 for transmission to the user; no is documents are supplied if no matches are found. The documents 210 may have been created during the documenting step 316 as part of the indexing phase, or they may be created in response to the keyword search being performed during the step 304.

In the latter case, the search engine 216 and the document generator 208 use the location information obtained from the index 214 to retrieve data values from the structured database 202 and then create corresponding documents 210 during the step 328. In one embodiment, only the individual data values that match the keyword and reside in the selected data items are retrieved. In another embodiment contextual information, such as nearby data values or table names, is also retrieved and documented. Retrieval during the step 326 may otherwise proceed generally as discussed in connection with the data reading step 314 above. The documenting step 328 may proceed generally as discussed in connection with the documenting step 316 above.

The step 330 may send documents 210 to the user interface 216 to be displayed on a screen as part of a graphical user interface, stored in a file, or otherwise used. The documents 210 may be summarized, compressed, encrypted, translated, or otherwise manipulated before, during, or after their transmittal.

The index maintaining step 306 proceeds generally like the allowing step 302, except that only some of the selected data items are indexed. For instance, a log of changes to the structured database 202 may be maintained by the database 202 or by the administration tool 206, so that only data values that may have changed are re-indexed.

Additional Examples

Figure 4:
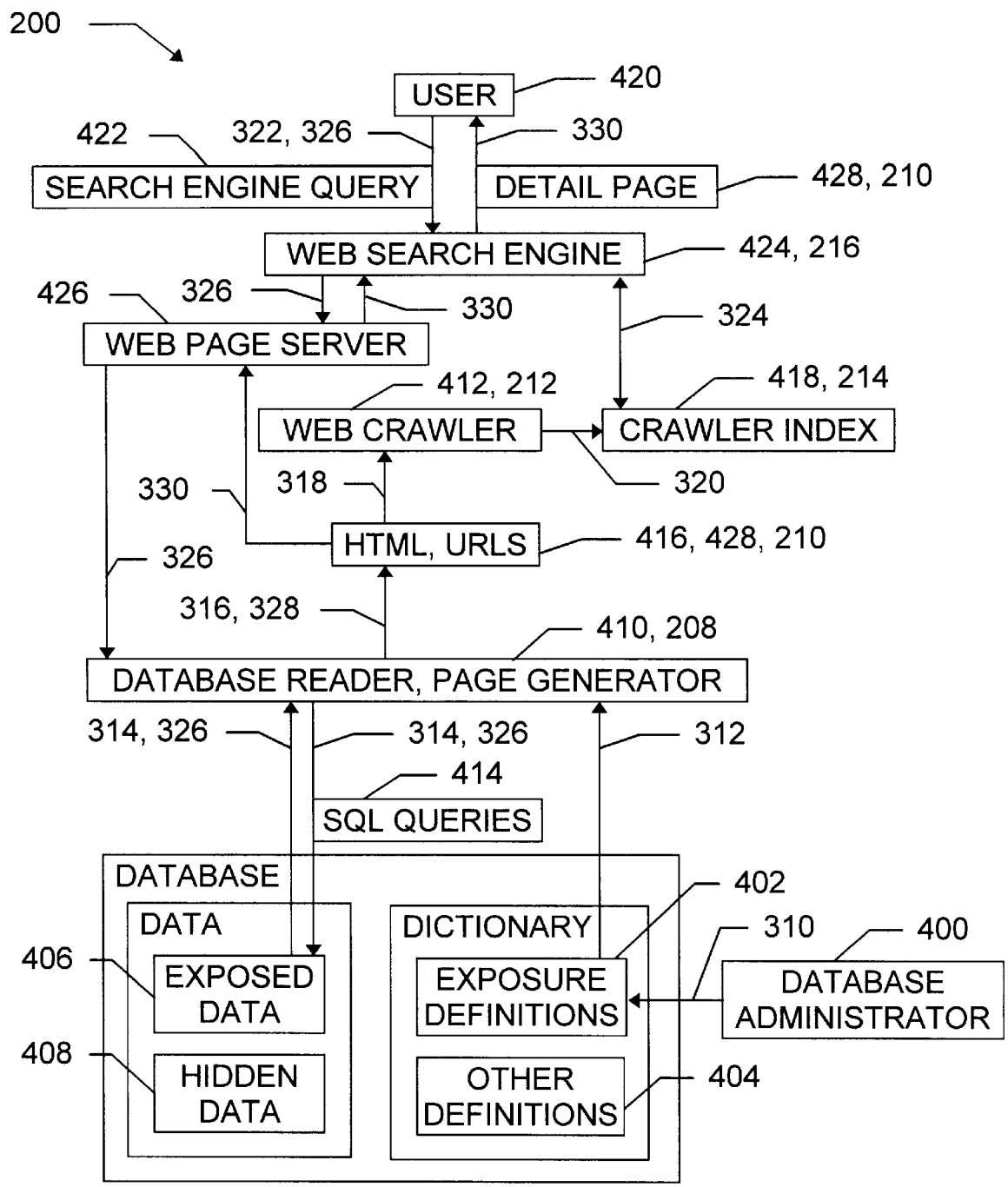
FIG. 4 is a data flow diagram illustrating components and methods of the present invention.

FIG. 4 illustrates further the components, environment, and operation of one embodiment of the invention; reference is also made to the earlier figures. FIG. 4 provides one of many possible examples; steps and/or components may be added, omitted, re-ordered, and/or performed concurrently in other embodiments according to the invention.

During the indexing phase, a database administrator 400 performs the editing step 310 by using the administration tool 206 to create exposure definitions 204 in the form of data dictionary definitions 402. A pre-existing data dictionary 404 defines the structure of the entire database 202; the exposure definitions 204 divide the data into a portion 406 which is exposed for indexing and a portion 408 which will not be indexed into the index 214. The data dictionary 402 may also be used to associate selected classes with specific tables or views, to associate default named attributes and attribute types with each selected table column, and to assist operations such as data type conversion and output formatting.

During the definition reading step 312, a combination database reader and page generator 410 (which act as the document generator 208) reads the data dictionary 402 to identify the portion of the database 202 that will be exposed to a web crawler 412 (which acts as the indexing agent 212). If the administrator 400 wishes to create a virtual record that is the join of several tables so that users 420 receive additional context in search results, the administrator 400 can use the tool 206 and the dictionary 402 to do so, and the database reader 410 will treat the resultant join as a composite record.

During the data retrieving step 314, the database reader 410 creates SQL queries 414 which will extract the exposed data 406, queries the database 202, and buffers the extracted data 406. During the documenting step 316, the page generator 410 creates HTML pages 416 containing the extracted data 406. The URL associated with each HTML page 416 includes a textual representation of the location in the database 202 from which the data represented in the page 416 was extracted.

During the providing step 318, the HTML pages 416 are made accessible to one or more web crawlers 412, along with the corresponding URLs generated by the page generator 410. During the associating step 320, the web crawler 412 reads the HTML pages 416 and creates or updates an index 418. This concludes the indexing phase, or at least the first iteration of the indexing phase; subsequent indexing may be interleaved with keyword searches or performed concurrently with such searches.

In the search phase, during the keyword obtaining step 322 a user 420 enters a keyword search 422 into a web or Internet or intranet search engine 424. During the step 324, the search engine 424 uses the crawler index 418 to generate search results that (for purposes of illustration we will assume) contain URLs generated by the page generator 410. During one version of the retrieving step 326, the corresponding pages 416, which were generated during the indexing phase, are then supplied to the search engine 424 for transmittal to the user 420. The search phase may end at this point.

However, during another version of the retrieving step 326, the user 420 may also request (implicitly or expressly) additional detail about a keyword search result whose URL was generated by the page generator 410, or the most current possible results. In response, the search engine 424 asks a web page server 426 for the HTML page located at the URL. The web server 426 asks the database reader 410 for the HTML page. The database reader 410 uses the data dictionary 402 to formulate a SQL query 414 for the corresponding current data, based on the data location information embedded in the URL. The database reader 410 accepts the SQL query response and buffers it. During the step 328, the page generator 410 creates detail HTML pages 428 containing the current data provided in the SQL query response. Finally, during the transmitting step 330, the page generator 410 makes the detail HTML pages 428 accessible to the web page server 426, which passes the detail HTML pages 428 to the search engine 424, which displays the detail HTML pages 428 to the user 420.

In one alternative embodiment, the structured database 202 includes data items organized as records in relations according to the data dictionary 404, the selecting step 300 includes the step of providing the supplemental data dictionary 402 which identifies selected records or tables, and the indexing step 320 only indexes records and tables that are identified by the supplemental data dictionary 402.

In some embodiments, the computer system 200 includes a selecting means for selecting data items in the structured database 202. Suitable selecting means include the exposure definitions 204 and/or 402, an exposure definition schema defining exposed elements of the database 202, the administration tool 206, software and/or hardware implementing the selecting step 300, and/or other selecting means, in appropriate combinations.

In some embodiments, but particularly if the structured database 202 includes a relational database and the data items include relational database records or tables, the selecting means includes the selection data dictionary 402 which specifies only selected relational database records or tables. The data dictionary 402 may be used when other definitions 404 are present, or when they are not, and may be used even if the database 202 is not entirely relational.

The system 200 also includes a retrieving means for retrieving from the database 202 the current data of a selected data item, such as the document generator 208, search engine 424, database reader 410, document server 426, software and/or hardware implementing the retrieving step 326, and/or other retrieving means, in appropriate combinations.

In addition, the system 200 includes an exposing means for exposing to the indexing agent 212 information about a data item's location in the database 202 together with information about the data item's retrieved data. Suitable exposing means include the document generator 208, page generator 410, documents 210 and/or 416 and/or 428, software and/or hardware implementing the documenting step 316 or providing step 318, means for invoking the agent 212 or crawler 412, and/or other exposing or documenting means, in appropriate combinations.

In one embodiment, the search engine interface 216 and the retrieving means reside on different nodes in the network 100 and communicate with one another using a TCP/IP network protocol. In another embodiment, communication is accomplished using an IPX network protocol.

In one embodiment, the administration tool 206 and other system 200 components are compatible with widely used commercial operating system, networking, and database management software and systems, and include a user interface designed to prevent confusion by limiting administrator 400 access to one set of exposure definitions 204 at a time. For instance, one embodiment supports the data dictionary 404 table layouts for major commercial database vendors such as Oracle, SQL Server, Sybase, and Informix. Different database vendors may have different names for different data types, so all types in the data dictionary 404 are coerced into one of the following types: Date; Number (includes at least Integer, Real, Float); and Char (includes at least VarChar2, Long).

At least initially, implementation may be eased by not supporting RAW or BLOB data types, but support for these and other types is included in alternative embodiments of the invention. Likewise, both textual and relational/structured information stores are becoming better adapted for use with graphical and audible data, such as static images, video clips, and audio files. Terms such as "textual" and "data value" used herein should be understood to include such digital forms of multi-media and audiovisual information.

The capabilities available through this embodiment of the tool 206 in an "Admin" menu include: New (start new exposure definitions 204); Open (open existing set of exposure definitions 204 for review and possible editing or copying); Save or Save As (save exposure definitions 204 in a file); Project (edit configuration values such as database 202 name, database 202 user ID and password); Generate (generate an HTML index file and HTML template files for each object class in the target directory for a currently open set of exposure definitions 204); Initialize (drop and create database dictionary tables in the current database 202 account); and Exit.

In this embodiment, information needed to connect the tool 206 to the database 202 includes: a file name (full path)

for the exposure definitions 402 and other configuration values; directory location(s) for HTML output template files; a database name (displayed at top of every output HTML page 210 in case multiple databases are crawled and indexed together); and a database user ID, password, and connection string (used by the tool 206 and the database reader 410 to log into and read the database 202). In one alternative embodiment, the information provided to the tool 206 also includes a directory location for an HTML index file 214.

The capabilities available through this embodiment of the tool 206 in an "Objects" menu include: Object Screen (list of database 202 user names populated on entry leads to list showing tables and views owned by selected user and object class information defined for each table); Attribute Sub-Screen (column names for table are queried and displayed; for newly defined objects with no existing attribute records, the column names are inserted in data dictionary first and then queried; by default, attributes are populated such that attribute labels are same as column name, sequence is same as column sequence, display flag is on, primary key flag is off, character data types are given an HTML string tag and domain Text, number data types are given an HTML numeric tag and domain Number (9999), and no units are initially assigned); Object Detail Sub-Screen (object details queried and displayed on entry; new object details may be defined by selecting from a list of currently defined object classes); Object Detail Attributes Sub-Screen (defines attributes for object detail, similarly to Attribute Sub-Screen, except that join conditions between object detail and object class must be defined, as by selecting attributes from lists in current object class and object detail).

The capabilities available through this embodiment of the tool 206 in a "Domains" menu include a Domain Screen. On entry, a list is populated with the domain names currently defined. As a domain is selected, the field values are displayed. The administrator 400 can add, update, and delete domain field values. By default, the following domains should be defined on creation of a data dictionary 402: Text (tagged as a key identifier), Text (plain), Number (9999), Number (9,999), Money ($9.99), Money ($9), Percent (9%), Percent (9.9%), Percent (9.99%), Date (MM/DD/YY), Date (DD-MON-YY).

The capabilities available through this embodiment of the tool 206 in a "Units" menu include a Units Screen. On entry a list is populated with the unit types currently defined. As a unit type is selected, the fields are displayed along with related units child records. The administrator 400 can add, update, and delete unit field values.

In one embodiment, the database reader 410 includes a crawler interface and the system 200 operates as follows. The crawler 412 crawls an URL for an index page 416 containing a list of hot links to all selected object classes. As the crawler follows the link from the index page 416 for each object class, the database reader 410 retrieves the corresponding record from the database 202 and feeds matching HTML text to the crawler 412 for indexing. HTML pages representing retrieved data are generated by the page generator 410.

The crawler 412 can work in two modes. In a Full Scan Mode, all selected records of the table are crawled and indexed. In an Update Only Mode, only records which have been added, updated, or deleted are retrieved and crawled. Updated records can be identified by logging them in a transaction table for the object class with their primary database key and a timestamp. The log must be updated as logged records are crawled. Transaction table columns include the primary key column(s) of the object class, an action code column (Add, Update, or Delete), and a timestamp column.

In one embodiment, the database reader 410 includes a query interface and the system 200 operates as follows. After the user 420 queries records in the crawler index 418, the user 420 seeks the current detailed database record. After selection of the hot link to the record, the database reader 410 queries the target table according to the location parameters in the hot link, which are the object class name and the primary database key values. The database reader 410 buffers the record and invokes the page generator 410, and the HTML text is sent back to the user 420 as previously described.

In addition, the following capabilities are provided in some embodiments of the database reader 410. Column level stored functions are defined at the domain or attribute level which allow the value of a database 202 column to be modified at query time. Input parameters for a domain level stored function include the column value and domain ID, and input parameters for an attribute level stored function include the column value, attribute ID, and row ID of the database 202 record. An output format mask is provided for numeric and date column data types. Unit scale conversions are supported. Multicolumn primary database keys for object classes and object details are supported. Finally, support is provided for managing multiple object classes and their detail records which are children of a parent object class record.

In one embodiment, the page generator 410 operates such that all database 202 column output is converted to ASCII or another character format and displayed according to the HTML template page for the particular object class involved. The format specification for template fields is in the form <object_class_name>.<attribute_label>. The name format for HTML template files is <object_class_table name>_tmplt.htm. Object class and database 202 name are displayed at the top of the generated page 416. Field alignment is center, right, or left, with left justification being the default.

In summary, the present invention provides a novel system and method for making structured database contents available through keyword searches. By making it possible to use web crawler indexes to locate relational database records and object-oriented database objects as well as word processed documents and web pages, the invention reduces the complexity and inefficiency of searches spanning heterogeneous data sources. Moreover, the invention leverages existing information and technology resources instead of requiring users to adopt expensive new systems that are not compatible with existing resources.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method supporting keyword searches of data items in a structured database, the method comprising the computer-implemented steps of:
   selecting at least one data item in the structured database, each selected item containing data and each selected item having a corresponding location identifier which identifies the item's location within the structured database;
   documenting the selected data items by creating at least one document outside the structured database which contains a textual representation of each selected item's data; and
   indexing the documents by creating an index outside the database, the index associating keywords in the textual representation of each selected item's data with that item's location identifier,
   wherein the structured database includes data items organized as records in relations according to a data dictionary, the selecting step includes the step of providing a supplemental data dictionary which identifies selected records or tables, and the indexing step only indexes records and tables that are identified by the supplemental data dictionary.

2. The method of claim 1, wherein the indexing step includes providing to a keyword search engine indexing agent both the textual representation of each selected item's data and the selected item's location identifier.

3. The method of claim 2, wherein the indexing agent produces an index that associates keywords with resource locators, and each resource locator includes a textual representation of a data item location identifier.

4. The method of claim 3, wherein the resource locator includes an URL.

5. The method of claim 3, wherein the resource locator includes a file path.

6. The method of claim 3, wherein the textual representations are comprehensive with respect to the data values of selected data items.

7. The method of claim 1, wherein the creating step creates an index containing keywords that are textual representations of data in the selected data items.

8. The method of claim 7, wherein the creating step creates an index containing keywords that are textual representations of non-numeric data in the selected data items.

9. A method supporting keyword searches of data items in a structured database, the method comprising the computer-implemented steps of:
   selecting at least one data item in the structured database, each selected item containing data and each selected item having a corresponding location identifier which identifies the item's location within the structured database;
   documenting the selected data items by creating at least one document outside the structured database which contains a textual representation of each selected item's data; and
   indexing the documents by creating an index outside the database, the index associating keywords in the textual representation of each selected item's data with that item's location identifier,
   wherein the indexing step includes providing to a keyword search engine indexing agent both the textual representation of each selected item's data and the selected item's location identifier, the indexing agent produces an index that associates keywords with resource locators, each resource locator includes a textual representation of a data item location identifier, and the resource locator includes a distinguished name.

10. A method supporting keyword searches of data items in a structured database, the method comprising the computer-implemented steps of:
    selecting at least one data item in the structured database, each selected item containing data and each selected item having a corresponding location identifier which identifies the item's location within the structured database;
    documenting the selected data items by creating at least one document outside the structured database which contains a textual representation of each selected item's data; and
    indexing the documents by creating an index outside the database, the index associating keywords in the textual representation of each selected item's data with that item's location identifier,
    wherein the creating step creates an index containing keywords that are textual representations of data in the selected data items and also containing every keyword that is a textual representation of data in the selected data items.

11. A method supporting keyword searches of data items in a structured database, the method comprising the computer-implemented steps of:
    selecting at least one data item in the structured database, each selected item containing data and each selected item having a corresponding location identifier which identifies the item's location within the structured database;
    documenting the selected data items by creating at least one document outside the structured database which contains a textual representation of each selected item's data;
    indexing the documents by creating an index outside the database, the index associating keywords in the textual representation of each selected item's data with that item's location identifier; and
    logging changes that are made to data items after the creating step and then updating the index to reflect at least some of the changes.

12. A method supporting keyword searches of data items in a structured database, the method comprising the computer-implemented steps of:
    selecting at least one data item in the structured database, each selected item containing data and each selected item having a corresponding location identifier which identifies the item's location in the structured database;
    allowing a network-roaming indexing agent to create an index which associates keywords with resource locators, each keyword being a textual representation of data from a selected data item and each resource locator containing a textual representation of the corresponding selected item's location identifier;
    obtaining a keyword from a search engine interface;
    using the index to obtain a resource locator associated with the keyword; and then
    using the resource locator to retrieve the item's current data from the structured database.

13. The method of claim 12, wherein the resource locator includes an URL.

14. The method of claim 12, wherein the allowing step reads a data dictionary which identifies only the selected data items.

15. The method of claim 12, wherein the allowing step includes reading data from data items which are records in a relational database.

16. The method of claim 12, wherein the allowing step includes reading data from data items which are nodes in a hierarchical database.

17. The method of claim 12, wherein the allowing step includes reading data from data items which are objects in an object-oriented database.

18. The method of claim 12, wherein the step of using the resource locator comprises extracting a data item's location identifier from the resource locator, and then using the location identifier to retrieve the item's current data.

19. The method of claim 12, wherein the step of using the resource locator includes generating a request to retrieve the item's current data from the database.

20. The method of claim 19, wherein the request includes an SQL query.

21. The method of claim 12, further comprising the computer-implemented step of generating a textual document containing the retrieved data.

22. The method of claim 21, wherein the document is generated in a markup language format.

23. The method of claim 22, wherein the document is generated in HTML format.

24. A computer storage medium having a configuration that represents data and instructions which will cause at least a portion of a computer system to perform method steps for supporting keyword searches of data items in a structured database, the method steps comprising the steps of claim 13.

25. The storage medium of claim 24, wherein the method steps comprise the steps of claim 15.

26. The storage medium of claim 24, wherein the method steps comprise the steps of claim 19.

27. The storage medium of claim 24, wherein the method steps comprise the steps of claim 20.

28. The storage medium of claim 24, wherein the method steps comprise the steps of claim 22.

29. A computer system comprising:
   selecting means for selecting data items in a structured database;
   retrieving means for retrieving from the database the current data of a selected data item; and
   exposing means for exposing to an indexing agent information about a data item's location in the database together with information about the data item's retrieved data,
   wherein the structured database includes a relational database, the data items include relational database records or tables, and the selecting means includes a selection data dictionary which specifies only selected relational database records or tables.

30. The system of claim 29, wherein the selecting means includes a schema defining elements of the structured database.

31. The system of claim 29, further comprising an administration tool for modifying the selecting means.

32. The system of claim 31, wherein the selecting means includes a selection data dictionary which specifies only selected relational database records or tables, and the administration tool is capable of creating and modifying the selection data dictionary.

33. The system of claim 29, wherein the retrieving means includes a database reader capable of generating requests to retrieve data from the structured database.

34. The system of claim 33, wherein the database reader is capable of generating SQL queries.

35. The system of claim 29, further comprising the indexing agent.

36. The system of claim 35, wherein the indexing agent includes a web crawler.

37. The system of claim 29, further comprising a search engine interface.

38. The system of claim 37, wherein the search engine interface and the retrieving means reside on different nodes in a network.

39. The system of claim 38, wherein the search engine interface and the retrieving means communicate with one another using a TCP/IP network protocol.

40. The system of claim 38, wherein the search engine interface and the retrieving means communicate with one another using an IPX network protocol.

41. The system of claim 29, further comprising an index produced by the indexing agent.

42. The system of claim 41, wherein the index contains keywords and corresponding resource locators for both the structured database and a textual document information source residing at a different network location than the structured database.

43. The system of claim 41, wherein the index contains keywords and corresponding resource locators for at least two structured databases residing at different network locations.

44. A computer system comprising:
   selecting means for selecting data items in a structured database;
   retrieving means for retrieving from the database the current data of a selected data item; and
   exposing means for exposing to an indexing anent information about a data item's location in the database together with information about the data item's retrieved data, wherein the exposing means includes a page generator capable of generating a textual document containing the retrieved data.

45. The system of claim 44, wherein the page generator is capable of generating an HTML page containing the retrieved data.

* * * * *